United States Patent
Manolakos et al.

(10) Patent No.: US 11,588,595 B2
(45) Date of Patent: Feb. 21, 2023

(54) SOUNDING REFERENCE SIGNAL AND DOWNLINK REFERENCE SIGNAL ASSOCIATION IN A POWER SAVING MODE

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US); Wooseok Nam, San Diego, CA (US); Huilin Xu, San Diego, CA (US); Peter Pui Lok Ang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 7 days.

(21) Appl. No.: 16/996,347

(22) Filed: Aug. 18, 2020

(65) Prior Publication Data
US 2021/0058210 A1 Feb. 25, 2021

(30) Foreign Application Priority Data
Aug. 23, 2019 (GR) .............................. 20190100368

(51) Int. Cl.
*H04L 5/00* (2006.01)
*H04W 52/02* (2009.01)

(52) U.S. Cl.
CPC ....... *H04L 5/0048* (2013.01); *H04W 52/0225* (2013.01)

(58) Field of Classification Search
CPC ... H04L 5/0094; H04L 5/0048; H04L 5/0023; H04L 5/0051; H04B 7/0404;
(Continued)

(56) References Cited

U.S. PATENT DOCUMENTS

| 2011/0260863 A1* | 10/2011 | Hooli | G01S 5/0009 340/539.32 |
| 2016/0212775 A1* | 7/2016 | Xu | H04W 76/10 |

(Continued)

FOREIGN PATENT DOCUMENTS

| WO | 2018137367 A1 | 8/2018 |
| WO | 2019029697 A1 | 2/2019 |

OTHER PUBLICATIONS

U.S. Appl. No. 62/823,534, filed Mar. 25, 2019 (Year: 2019).*
(Continued)

*Primary Examiner* — Ian N Moore
*Assistant Examiner* — Sun Jong Kim
(74) *Attorney, Agent, or Firm* — Harrity & Harrity, LLP

(57) ABSTRACT

Aspects of the present disclosure relate to wireless communication. In some aspects, a user equipment (UE) may receive a configuration that indicates an association between a sounding reference signal (SRS) resource set and a downlink reference signal resource to be used to determine a transmission property of one or more SRSs in the SRS resource set, wherein the downlink reference signal resource is associated with a first set of ports to be used for performing measurement of the downlink reference signal resource. The UE may determine the transmission property of the one or more SRSs in the SRS resource set using fewer ports than a number of ports included in the first set of ports, based at least in part on a determination that the UE is operating in a power saving mode. The UE may transmit the one or more SRSs using the transmission property. Other aspects are provided.

30 Claims, 7 Drawing Sheets

(58) Field of Classification Search
CPC ............ H04B 7/0617; H04W 52/0209; H04W 52/0225; H04W 76/27; Y02D 30/70
See application file for complete search history.

(56) References Cited

U.S. PATENT DOCUMENTS

| | | | | |
|---|---|---|---|---|
| 2017/0078065 | A1* | 3/2017 | Nam | H04L 5/005 |
| 2017/0302353 | A1* | 10/2017 | Rahman | H04B 7/0486 |
| 2018/0167183 | A1* | 6/2018 | Zhang | H04L 1/0027 |
| 2019/0109679 | A1 | 4/2019 | Liu et al. | |
| 2019/0349964 | A1* | 11/2019 | Liou | H04W 72/046 |
| 2021/0243763 | A1* | 8/2021 | Zhou | H04L 1/1819 |
| 2021/0281448 | A1* | 9/2021 | Li | H04L 5/0051 |
| 2021/0321446 | A1* | 10/2021 | Lee | H04L 5/0044 |

OTHER PUBLICATIONS

"Aperiodic SRS trigger list correction in 38.214", 3GPP TSG-RAN WG1 Meeting #98, Prague, CZ, Aug. 26-30, 2019 (R1-1909418), uploaded and publicly available on Aug. 17, 2019 (Year: 2019).*

CMCC: "Discussion on Remaining Issues on SRS", 3GPP TSG RAN WG1 Meeting #93, 3GPP Draft; R1-1806360, 3rd GenerationPartnership Project (3GPP), Mobilecompetence Centre; 650, Route Des Lucioles; F-06921 Sophia-Antipolis Cedex; France, vol. RAN WG1, No. Busan, Korea; May 21, 2018-May 25, 2018, May 20, 2018 (May 20, 2018), 5 Pages, XP051441565, Retrieved from the Internet: URL: http://www.3gpp.org/ftp/Meetings%5F3GPP% 5FSYNC/RAN1/Docs [retrieved on May 20, 2018].
Ericsson: "Aperiodic SRS Trigger List Correction in 38.214", 3GPP TSG-RAN WG1 Meeting #98, R1 -1909418, Prague, CZ, Aug. 26-30, 2019, DRAFTCR 38214 Aperiodic SRS Trigger List, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), pp. 1-3, XP051766023,Retrieved from the Internet: URL: http://www.3gpp.org/ftp/tsg ran/WG1_RL1/ TSGR1_98/Docs/R1-1909418.zip [retrieved on Aug. 17, 2019].
International Search Report and Written Opinion—PCT/US2020/ 047009—ISA/EPO—dated Nov. 16, 2020.

* cited by examiner

SOUNDING REFERENCE SIGNAL AND DOWNLINK REFERENCE SIGNAL ASSOCIATION IN A POWER SAVING MODE

CROSS-REFERENCE TO RELATED APPLICATION

This patent application claims priority to Greece Patent Application No. 20190100368, filed on Aug. 23, 2019, entitled "SOUNDING REFERENCE SIGNAL AND DOWNLINK REFERENCE SIGNAL ASSOCIATION IN A POWER SAVING MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sounding reference signal and downlink reference signal association in a power saving mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration that indicates an association between a sounding reference signal (SRS) resource set and a downlink reference signal resource to be used to determine a transmission property of one or more SRSs in the SRS resource set, wherein the downlink reference signal resource is associated with a first set of ports to be used for performing measurement of the downlink reference signal resource; determining the transmission property of the one or more SRSs in the SRS resource set using fewer ports than a number of ports included in the first set of ports, based at least in part on a determination that the UE is operating in a power saving mode; and transmitting the one or more SRSs using the transmission property.

In some aspects, a UE for wireless communication may include memory and one or more processors operatively coupled to the memory. The memory and the one or more processors may be configured to receive a configuration that indicates an association between an SRS resource set and a downlink reference signal resource to be used to determine a transmission property of one or more SRSs in the SRS resource set, wherein the downlink reference signal resource is associated with a first set of ports to be used for performing measurement of the downlink reference signal resource; determine the transmission property of the one or more SRSs in the SRS resource set using fewer ports than a number of ports included in the first set of ports, based at least in part on a determination that the UE is operating in a power saving mode; and transmit the one or more SRSs using the transmission property.

In some aspects, a non-transitory computer-readable medium may store one or more instructions for wireless communication. The one or more instructions, when executed by one or more processors of a UE, may cause the one or more processors to: receive a configuration that indicates an association between an SRS resource set and a downlink reference signal resource to be used to determine a transmission property of one or more SRSs in the SRS resource set, wherein the downlink reference signal resource is associated with a first set of ports to be used for performing measurement of the downlink reference signal resource; determine the transmission property of the one or more SRSs in the SRS resource set using fewer ports than a number of ports included in the first set of ports, based at least in part on a determination that the UE is operating in a power saving mode; and transmit the one or more SRSs using the transmission property.

In some aspects, an apparatus for wireless communication may include means for receiving a configuration that indicates an association between an SRS resource set and a downlink reference signal resource to be used to determine a transmission property of one or more SRSs in the SRS resource set, wherein the downlink reference signal resource is associated with a first set of ports to be used for performing measurement of the downlink reference signal resource; means for determining the transmission property of the one or more SRSs in the SRS resource set using fewer ports than a number of ports included in the first set of ports, based at least in part on a determination that the apparatus is operating in a power saving mode; and means for transmitting the one or more SRSs using the transmission property.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
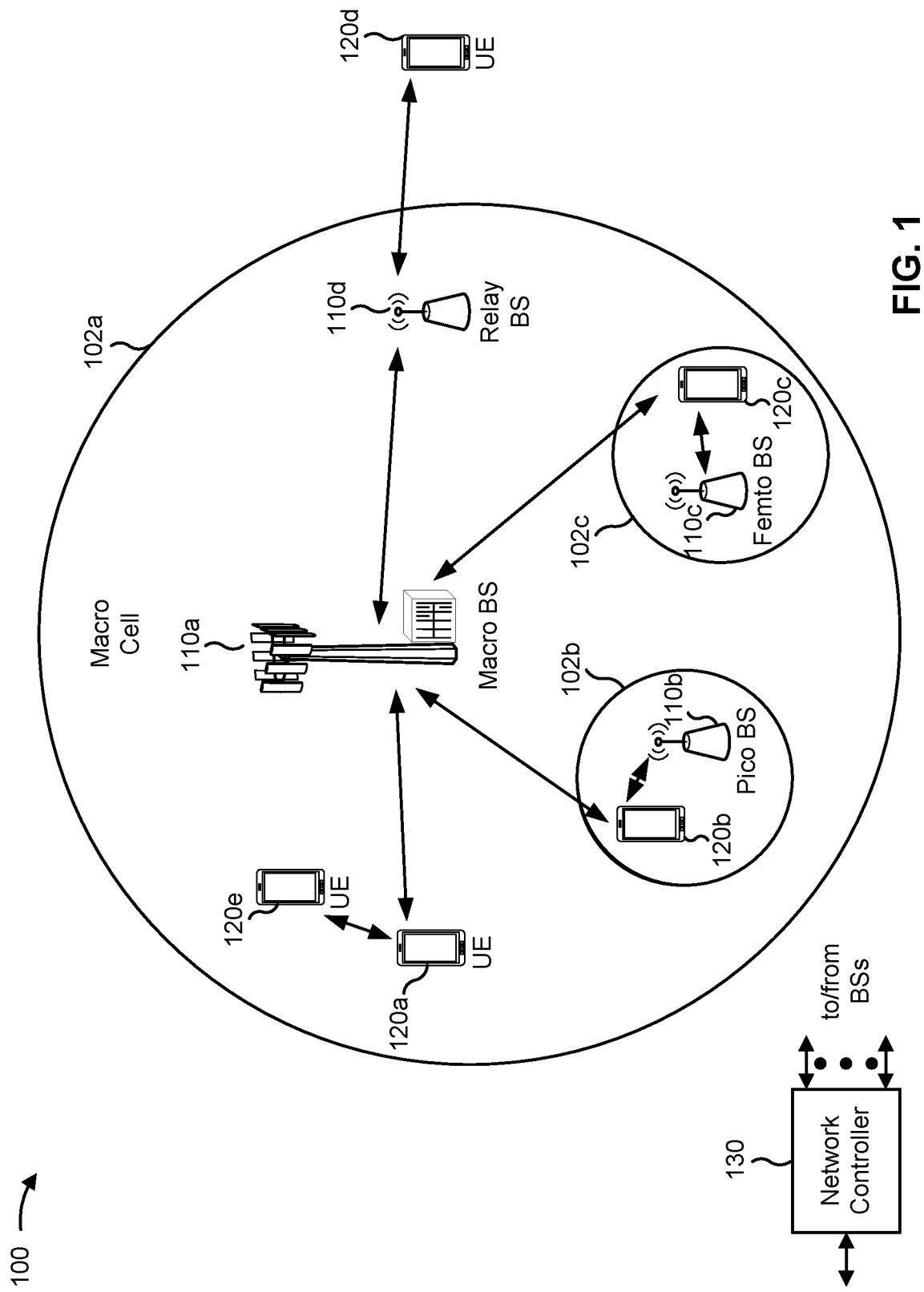
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
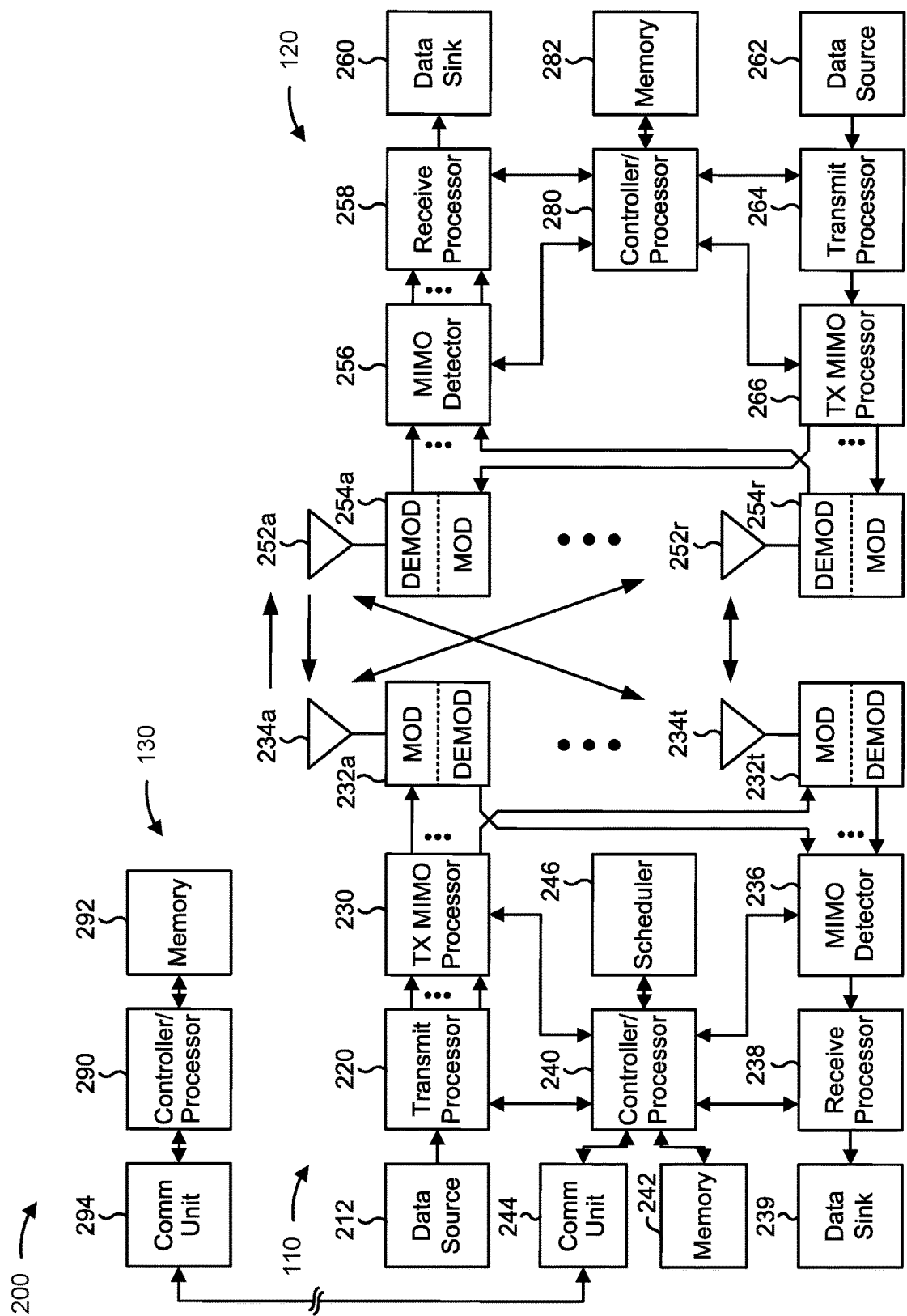
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sounding reference signal (SRS) and downlink reference signal association in a power saving mode, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for receiving a configuration that indicates an association between an SRS resource set and a downlink reference signal resource to be used to determine a transmission property of one or more SRSs in the SRS resource set, wherein the downlink reference signal resource is associated with a first set of ports to be used for performing measurement of the downlink reference signal resource; means for determining the transmission property of the one or more SRSs in the SRS resource set using fewer ports than a number of ports included in the first set of ports, based at least in part on a determination that the UE 120 is operating in a power saving mode; means for transmitting the one or more SRSs using the transmission property; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
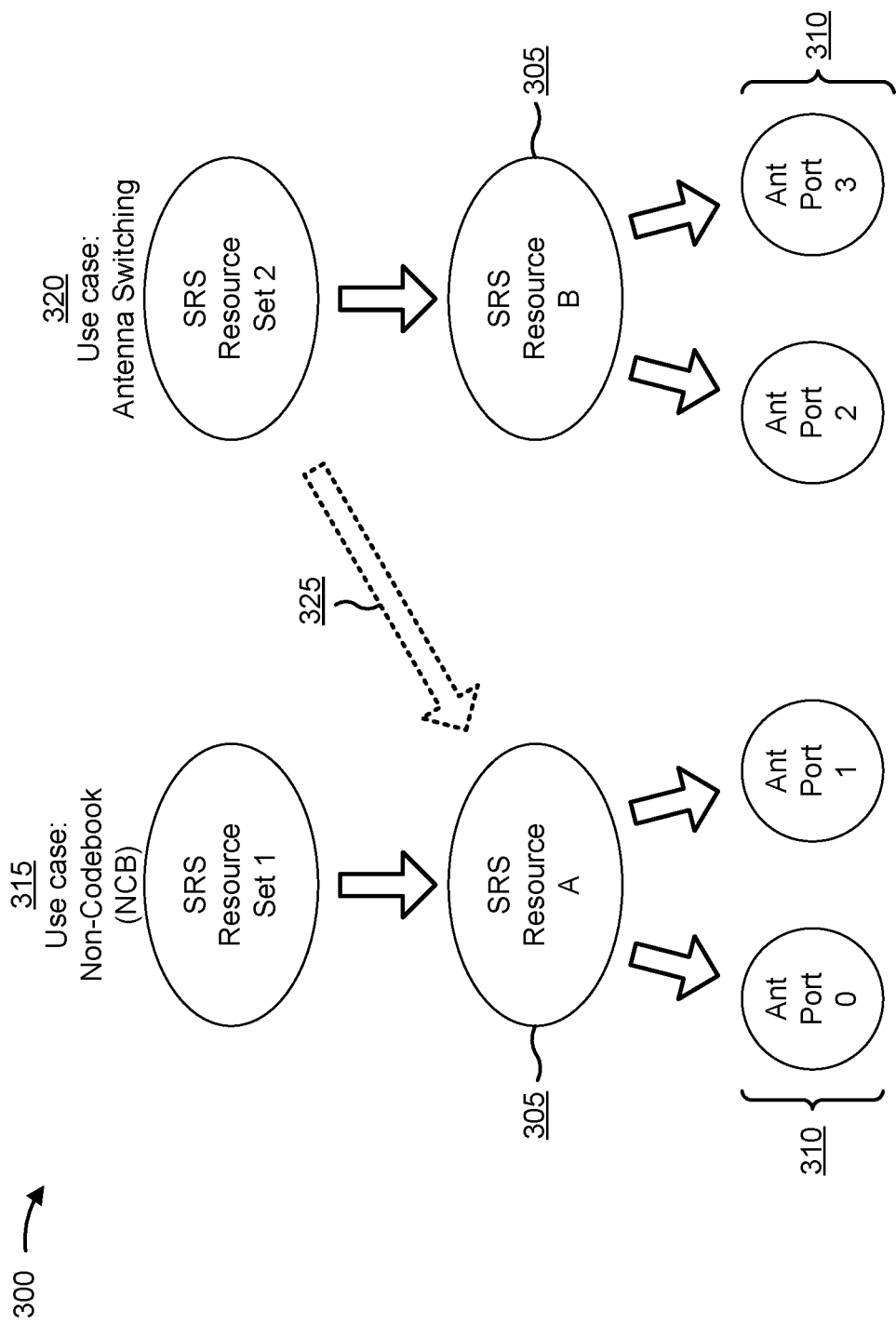
FIG. 3 is a diagram illustrating an example of sounding reference signal (SRS) resource sets, in accordance with various aspects of the present disclosure.

FIG. 3 is a diagram illustrating an example 300 of sounding reference signal (SRS) resource sets, in accordance with various aspects of the present disclosure.

A base station 110 may configure a UE 120 with one or more SRS resource sets to allocate resources for SRS transmissions by the UE 120. For example, a configuration for SRS resource sets (e.g., an SRS resource set configuration) may be indicated in a radio resource control (RRC) message, such as an RRC configuration message, an RRC reconfiguration message, and/or the like. As shown by reference number 305, an SRS resource set may include one or more resources (e.g., shown as SRS resources), which may include time resources and/or frequency resources (e.g., a slot, a symbol, a resource block, a periodicity for the time resources, and/or the like).

As shown by reference number 310, an SRS resource may include one or more antenna ports on which an SRS is to be transmitted (e.g., in a time-frequency resource). Thus, an SRS resource set configuration may indicate one or more time-frequency resources in which an SRS is to be transmitted, and may indicate one or more antenna ports on which the SRS is to be transmitted in those time-frequency resources. In some aspects, the SRS resource set configuration may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

As shown by reference number 315, a first SRS resource set (e.g., shown as SRS Resource Set 1) may have a non-codebook use case. As shown, this example non-codebook SRS resource set includes a first SRS resource (shown as SRS Resource A). As shown, SRS Resource A may be associated with antenna port 0 and antenna port 1. In this case, non-codebook SRS may be transmitted in SRS Resource A (e.g., a first time-frequency resource) using antenna port 0 and antenna port 1.

As shown by reference number 320, a second SRS resource set (e.g., shown as SRS Resource Set 2) is shown as having an antenna switching use case. As shown, this example antenna switching SRS resource set includes a second SRS resource (shown as SRS Resource B). As shown, SRS Resource B may be associated with antenna port 2 and antenna port 3. Thus, antenna switching SRS may be transmitted in SRS Resource B (e.g., a second time-frequency resource) using antenna port 2 and antenna port 3.

As shown by reference number 325, in some aspects, different SRS resource sets indicated to the UE 120 (e.g., having different use cases) may overlap (e.g., in time, in frequency, and/or the like, such as in the same slot). For example, SRS Resource Set 2 may also include the first SRS resource (e.g., SRS Resource A). In this case, antenna switching SRS may also be transmitted in SRS Resource A (e.g., the first time-frequency resource) using antenna port 0 and antenna port 1.

As indicated above, FIG. 3 is provided as an example. Other examples may differ from what is described with regard to FIG. 3.

Figure 4:
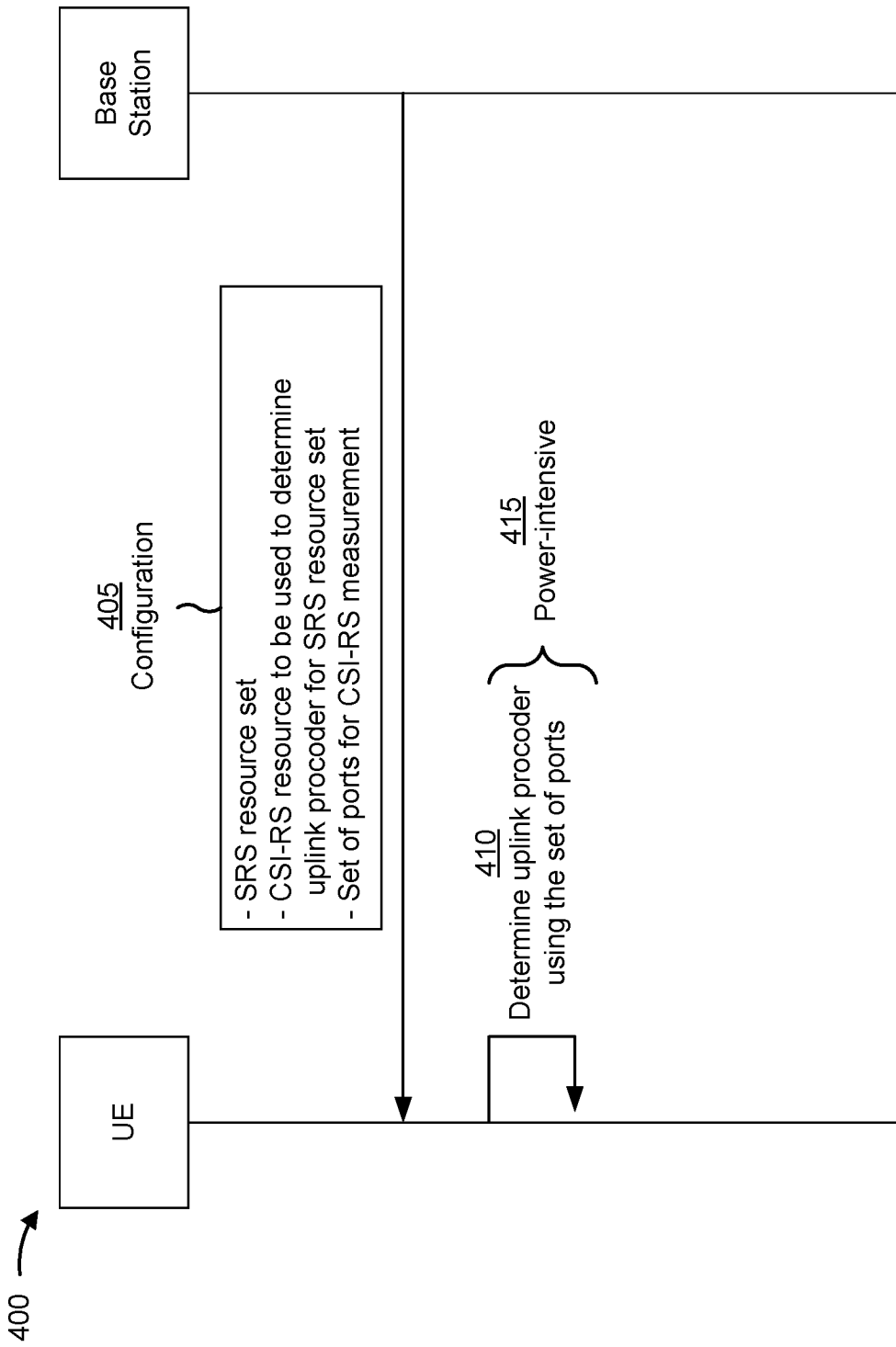
FIG. 4 is a diagram illustrating an example of SRS and channel state information reference signal (CSI-RS) association, in accordance with various aspects of the present disclosure.

FIG. 4 is a diagram illustrating an example 400 of SRS and channel state information reference signal (CSI-RS) association, in accordance with various aspects of the present disclosure. As shown in FIG. 4, a base station and a UE may communicate with one another.

As shown by reference number 405, the base station may transmit, to the UE, a configuration that indicates an SRS resource set (e.g., as described above in connection with FIG. 3) and an association between the SRS resource set and a CSI-RS resource (e.g., a non-zero power (NZP) CSI-RS resource) to be used to determine an uplink precoder for the SRS resource set. As further shown, the configuration may indicate a set of ports to be used for measuring the CSI-RS resource. In some aspects, the configuration may be indicated in an RRC message. In some aspects, transmission of SRS (e.g., aperiodic SRS) may be triggered by downlink control information (DCI). In some aspects, the DCI may indicate the associated CSI-RS resource.

The SRS resource set may have a non-codebook use case, and the UE may select an uplink precoder to be used to precode non-codebook SRS transmissions included in the SRS resource set. Based at least in part on the configuration, the UE may measure the indicated CSI-RS resource, associated with the non-codebook SRS resource set, on the set of ports indicated in the configuration. As shown by reference number 410, the UE may use measurements of the CSI-RS resource on the set of ports to determine (e.g., select) an uplink precoder for transmission of non-codebook SRS resources included in the SRS resource set.

As shown by reference number 415, determining an uplink precoder in this manner may be power-intensive for the UE. For example, using the full set of ports to measure CSI-RS, and using those measurements to determine an uplink precoder, consumes processing resources of the UE (e.g., using a baseband processor, a MIMO decoder, and/or the like), memory resources of the UE, antenna resources of the UE (e.g., due to activation of Rx antennas and/or panels needed for signal reception), and/or the like, which consumes battery power of the UE. In some cases, such power consumption may be justified due to increased performance, throughput, and/or the like for the UE. However, in some cases, such power consumption may be excessive and unnecessary for the UE.

For example, in some cases, the UE may be configured with a maximum number of multiple input multiple output (MIMO) layers that is less than the number of physical antennas (e.g., receive (Rx) antennas) of the UE. For example, the UE may have 4 Rx antennas and may be configured with a maximum of 2 MIMO layers. In this case, the UE may deactivate 2 Rx antennas of the 4 Rx antennas to save power. As a result, the UE may be unable to measure a CSI-RS resource on one or more ports. When the CSI-RS resource is associated with an SRS resource set (e.g., is used for determination of an uplink precoder for SRSs of the SRS resource set), then the UE may be unable to derive the uplink precoder in a manner configured by the base station (e.g., using the set of ports indicated by the base station).

Some techniques and apparatuses described herein permit the UE to transmit SRS associated with a CSI-RS resource (or another downlink reference signal) when the UE is in a power saving mode and/or does not measure the CSI-RS resource on the full set of ports indicated by the base station. In this way, the UE may still be capable of determining an uplink precoder for SRS transmission and/or transmitting the SRS despite not being able to measure the full set of ports indicated by the base station. In this way, the UE may save power and extend battery life.

As indicated above, FIG. 4 is provided as an example. Other examples may differ from what is described with regard to FIG. 4.

Figure 5:
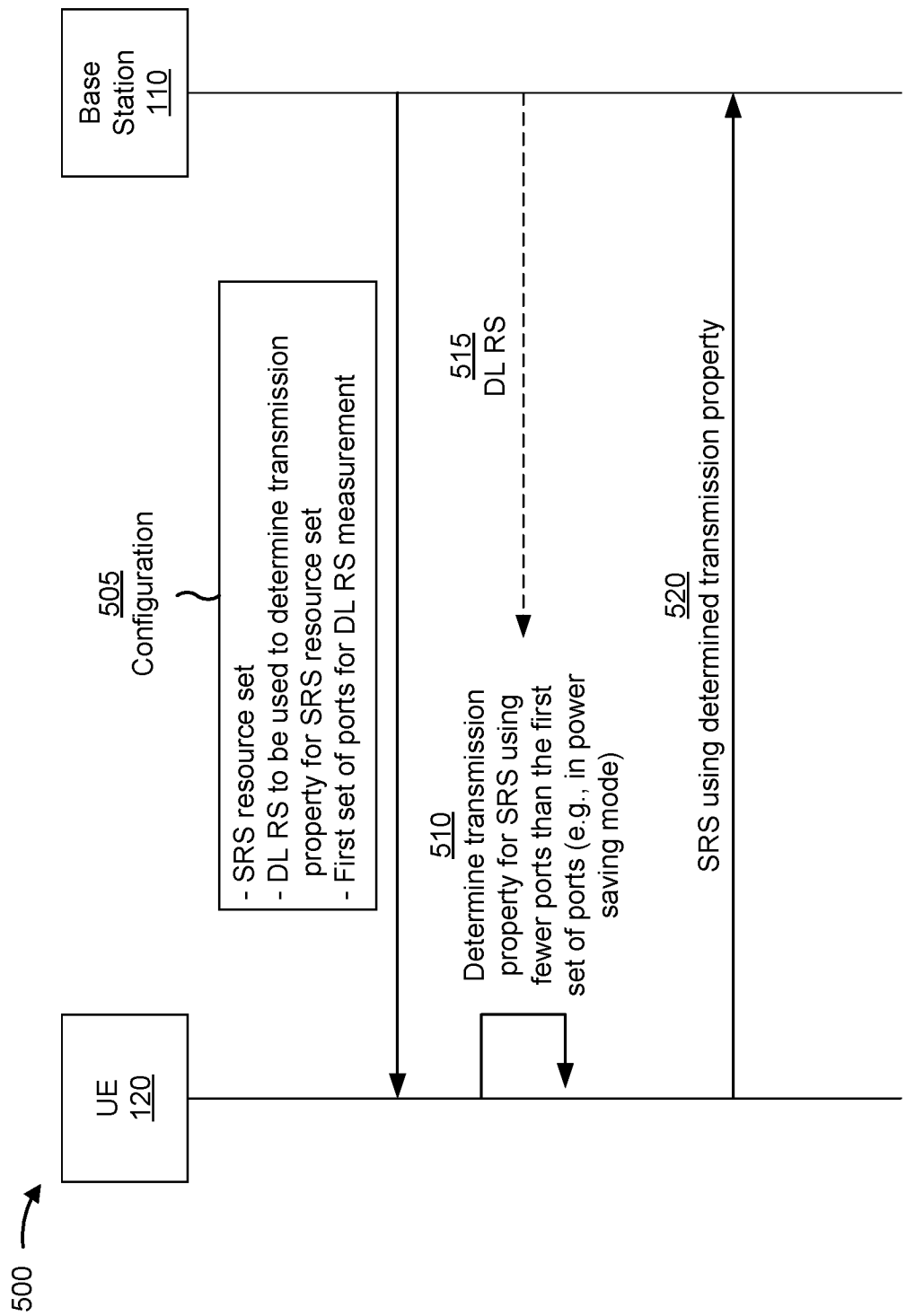
FIGS. 5 and 6 are diagrams illustrating examples of SRS and downlink reference signal association in a power saving mode, in accordance with various aspects of the present disclosure.

FIG. 5 is a diagram illustrating an example 500 of SRS and downlink reference signal association in a power saving mode, in accordance with various aspects of the present disclosure. As shown in FIG. 5, a base station 110 and a UE 120 may communicate with one another.

As shown by reference number 505, the base station 110 may transmit a configuration to the UE 120. The configuration may indicate an SRS resource set (e.g., as described above in connection with FIG. 3) and an association between the SRS resource set and a downlink reference signal (DL RS) resource to be used to determine a transmission property (e.g., an uplink precoder) for the SRS resource set (e.g., for one or more SRSs in the SRS resource set). As further shown, the configuration may indicate a first set of ports to be used for measuring the downlink reference signal resource. In some aspects, the downlink reference signal resource may include a CSI-RS resource, an NZP CSI-RS resource, a positioning reference signal (PRS) resource, and/or the like. In some aspects, the configuration may be indicated in an RRC message. In some aspects, transmission of SRS (e.g., aperiodic SRS) may be triggered by downlink control information (DCI). In some aspects, the DCI may indicate the associated CSI-RS resource.

As shown by reference number 510, the UE 120 may determine the transmission property using fewer ports than the first set of ports. For example, a number of ports used by the UE 120 to determine the transmission property may be less than the number of ports included in the first set of ports. In some aspects, the UE 120 may determine to use the fewer ports to derive the transmission property based at least in part on a determination that the UE 120 is operating in a power saving mode. In this way, the UE 120 may conserve battery power and other resources of the UE (e.g., processing resources, memory resources, and/or the like) by using the fewer ports. The transmission property may include, for example, an uplink precoder for transmission of SRS (e.g., for a non-codebook SRS), a pathloss estimate for an SRS (e.g., for a positioning SRS), a spatial transmission beam associated with a neighbor cell (e.g., for a positioning SRS) a downlink precoder for downlink purposes from an associated downlink reference signal (e.g., for an antenna switching SRS), an SRS-driven downlink beamforming estimation (e.g., for an antenna switching SRS), and/or the like. In some aspects, "a transmission property for one or more SRS resources" may refer to a transmission property for an SRS resource set to which the one or more SRS resources belong, a transmission property that is shared by the one or more SRS resources (e.g., that is the same for all of the SRS resources in the SRS resource set), a transmission property for each of the one or more SRSs (e.g., a transmission property that may be the same or different for different SRSs in the SRS resource set), and/or the like.

In some aspects, the UE 120 may determine that the UE 120 is operating in the power saving mode based at least in part on a signal (e.g., an explicit signal or an implicit signal). The signal may be transmitted by the UE 120 to the base station 110 or may be received by the UE 120 from the base station 110. In some aspects, the signal may be indicated by an RRC message, by a medium access control (MAC) control element (CE) (collectively, MAC-CE), by DCI, and/or the like. In some aspects, the signal may be indicated in a combination of two or more of an RRC message, a MAC-CE, and/or DCI. Additionally, or alternatively, an RRC message may include a field that configures and/or activates a power saving mode for the UE 120, a MAC-CE may activate or deactivate the power saving mode for the UE 120, a specific DCI format may be used to indicate the power saving mode for the UE 120, a specific radio network temporary identifier (RNTI) associated with a power saving mode may be used (e.g., for a physical downlink control channel (PDCCH) communication, a physical downlink shared channel (PDSCH) communication, and/or the like), a specific SRS scrambling identifier associated with a power saving mode may be used, and/or the like. Additionally, or alternatively, a particular value or a set of values in a signaling message (e.g., an RRC message, a MAC-CE, DCI, and/or the like) may activate the power saving mode for the UE 120. For example, the power saving mode may be activated based at least in part on an active bandwidth part for the UE 120 (e.g., a bandwidth part having a bandwidth less than a threshold), a periodicity of PDCCH monitoring occasions for the UE 120 (e.g., a periodicity that satisfies a threshold), a configured number of ports for the UE 120 (e.g., a configuration that indicates fewer ports for downlink reception than a number of ports supported by the UE), a UE capability report, and/or the like.

In some aspects, the fewer number of ports may be zero ports. For example, the UE 120 may determine the transmission property without performing measurement of the downlink reference signal resource using any ports included in the first set of ports. Alternatively, the fewer number of ports may include at least one port. For example, the UE 120 may determine the transmission property based at least in part on performing measurement of the downlink reference signal resource using a second set of ports (e.g., one or more ports) that is a subset of the first set of ports indicated in the configuration. In some aspects, the first set of ports and/or the second set of ports may be determined and/or configured based at least in part on an indication, by the UE 120, of one or more lists of supported combinations for the association between the SRS resource set and the downlink reference signal resource, as described in more detail below in connection with FIG. 6.

For example, as shown by reference number 515, the base station 110 may transmit a downlink reference signal in the downlink reference signal resource indicated in the configuration. The UE 120 may measure the downlink reference signal resource, associated with the SRS resource set, using the second set of ports. Based at least in part on the measurement, the UE 120 may determine a transmission property for transmission of one or more SRSs in the SRS resource set. For example, the UE 120 may determine an uplink precoder for transmission of the one or more SRSs based at least in part on measuring the downlink reference signal resource using the second set of ports.

As shown by reference number 520, the UE 120 may transmit the one or more SRSs, configured in the SRS resource set, using the transmission property. For example, if the transmission property is an uplink precoder, then the UE 120 may transmit the one or more SRSs using the uplink precoder (e.g., by precoding the SRS transmissions according to the uplink precoder). By using fewer ports than a number of ports indicated for the association between the downlink reference signal resource and the SRS resource set, the UE 120 may conserve battery power, such as by using fewer processing resources and/or memory resources for processing measurements (e.g., due to using a smaller number of ports), activating fewer antennas, and/or the like.

In some aspects, the UE 120 may refrain from updating the transmission property (e.g., an uplink precoder) if there is insufficient processing time between reception of the downlink reference signal resource and transmission of an SRS for which the transmission property is to be determined based at least in part on measuring the CSI-RS resource. For example, in a non-power saving mode, the UE 120 may refrain from updating the transmission property if a time between a last symbol of the downlink reference signal resource and a first symbol of an SRS to be transmitted is less than a first threshold. In some aspects, the first threshold is 42 orthogonal frequency division multiplexing (OFDM) symbols. Additionally, or alternatively, in a power saving mode, the UE 120 may refrain from updating the transmission property if a time between a last symbol of the downlink reference signal resource and a first symbol of an SRS to be transmitted is less than a second threshold. In some aspects, the second threshold is more than 42 OFDM symbols. Thus, the second threshold may be greater than the first threshold. In this way, a UE 120 in a power saving mode may be given more processing time because the UE 120 may be operating using fewer UE resources, less functionality, deactivated components, and/or the like as compared to a UE 120 in a non-power saving mode.

In some aspects, a performance requirement that the UE 120 is expected to satisfy when the transmission property is determined using the fewer ports is different from a performance requirement that the UE 120 is expected to satisfy when the transmission property is determined using all ports in the first set of ports. For example, the UE 120 may be expected to satisfy a higher performance requirement (e.g., a lower target block error rate (BLER) and/or the like) when non-codebook SRS is associated with a CSI-RS resource, as compared to a lower performance requirement (e.g., a baseline performance requirement) that the UE 120 is expected to satisfy when non-codebook SRS is not associated with a CSI-RS resource. By determining the transmission property using fewer ports than a number of configured ports for the association between CSI-RS and SRS, the UE 120 may be able to satisfy the lower performance requirement while saving battery power and conserving UE resources (but may not be able to satisfy the higher performance requirement).

The operations described herein (e.g., in connection with FIG. 5 and FIG. 6) may be used for a variety of downlink reference signals associated with a variety of types of SRS resources. For example, the operations described herein may be used for a CSI-RS resource associated with a non-codebook SRS. As another example, the operations described herein may be used for a CSI-RS resource associated with an antenna switching SRS (and/or an SRS for downlink channel acquisition), such as for SRS-driven downlink beamforming estimation. As another example, the operations described herein may be used for a positioning reference signal (PRS) resource associated with an SRS for positioning, such as for deriving a pathloss estimate associated with a neighbor cell, a spatial transmission beam associated with a neighbor cell, and/or the like.

As indicated above, FIG. 5 is provided as an example. Other examples may differ from what is described with regard to FIG. 5.

Figure 6:
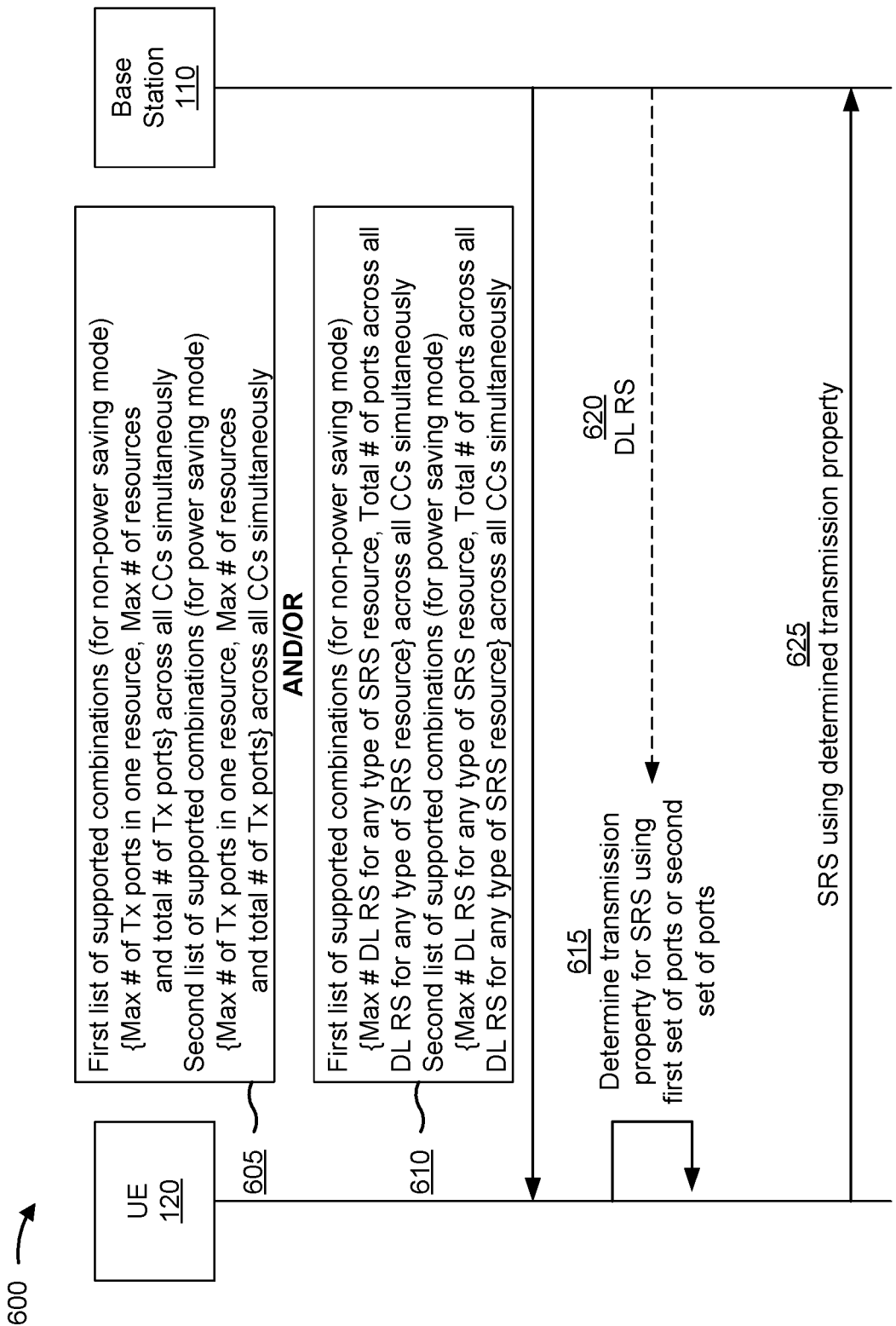

FIG. 6 is a diagram illustrating an example 600 of SRS and downlink reference signal association in a power saving mode, in accordance with various aspects of the present disclosure. As shown in FIG. 6, a base station 110 and a UE 120 may communicate with one another. As described below, the UE 120 may indicate, to the base station 110, one or more lists of supported combinations for the association between the SRS resource set and the downlink reference signal resource. The one or more lists may be used to determine and/or a configure a first set of ports and/or a second set of ports for measurement of a downlink reference signal resource, as described above in connection with FIG. 5.

As shown in FIG. 6, the UE 120 may transmit, to the base station 110, a first list of supported combinations, for the association between the SRS resource set and the downlink reference signal resource, for a non-power saving mode. As further shown, the UE 120 may transmit a second list of supported combinations, for the association between the SRS resource set and the downlink reference signal resource, for a power saving mode.

As shown by reference number 605, a list of supported combinations may indicate a maximum number of transmit ports for a single resource, a maximum number of resources, and/or a total number of ports (e.g., a total number of transmit ports). In some aspects, one or more of these parameters may indicate a capability of the UE 120 across all component carriers (CCs) simultaneously (e.g., a maximum number of transmit ports that can be used for a single resource simultaneously across all CCs configured for the UE 120, a maximum number of simultaneous resources that can be configured for the UE 120 across all the CCs, a total number of ports that can be used by the UE 120 simultaneously across all the CCs, and/or the like).

As used herein, "a maximum number of transmit ports for a single resource" may refer to a maximum number of transmit ports that the UE 120 is capable of using for measurement of the downlink reference signal resource (e.g., the CSI-RS resource). A "maximum number of resources" may refer to a maximum number of downlink reference signal resources (e.g., CSI-RS resources) that can be configured for the UE 120 as being associated with an SRS resource set. A "total number of ports" may refer to a total number of downlink reference signal ports (e.g., CSI-RS ports) of the downlink reference signal resources (e.g., CSI-RS resources) that can be associated with an SRS resource set for the UE 120. In some aspects, the maximum number of transmit ports for a single resource may be set to a value from the set {2, 4, 8, 12, 16, 24, 32}. In some aspects, the maximum number of resources may be set to a value from 1 to 64. In some aspects, the total number of ports may be set to a value from 2 to 256.

In some aspects, a UE capability indicated for the non-power saving mode may be different from a UE capability indicated for the power saving mode. For example, the first list may indicate a first maximum number of transmit ports for a single resource, a first maximum number of resources, and/or a first total number of ports, while the second list may indicate a second maximum number of transmit ports for a single resource, a second maximum number of resources, and/or a second total number of ports. In some aspects, a UE capability indicated for the non-power saving mode may be more advanced than a UE capability indicated for the power saving mode. For example, the second maximum number of transmit ports for a single resource may be less than the first maximum number of transmit ports for a single resource, the second maximum number of resources may be less then the first maximum number of resources, the second total number of ports may be less than the first total number of ports, and/or the like.

In some aspects, the parameters shown in connection with reference number 605 may be used for an association between CSI-RS resources and a non-codebook SRS resource set. However, as described above in connection with FIG. 5, other downlink reference signal resources may be associated with an SRS resource set, and the SRS resource set may have a different usage (e.g., antenna switching, positioning, and/or the like). Thus, as shown by reference number 610, a list of supported combinations may indicate a maximum number of downlink reference signal resources associated with any type of SRS resource and/or a total number of ports across all downlink reference signal resources associated with any type of SRS resource. In some aspects, one or more of these parameters may indicate a capability of the UE 120 across all CCs simultaneously (e.g., a maximum number of simultaneous downlink reference signal resources that can be associated with any type of SRS resource across all CCs configured for the UE 120, a total number of ports that can be used by the UE 120 simultaneously across all downlink reference signal resources associated with any type of SRS resource and across all the CCs, and/or the like).

As used herein, "a maximum number of downlink reference signal resources associated with any type of SRS resource" may refer to a maximum number of downlink reference signal resources (e.g., CSI-RS resources, PRS resources, and/or the like) that can be configured for the UE 120 as being associated with an SRS resource set (e.g., for any type of SRS resource set). A "total number of ports across all downlink reference signal resources associated with any type of SRS resource" may refer to a total number of downlink reference signal ports (e.g., CSI-RS ports, PRS ports, and/or the like) of the downlink reference signal resources (e.g., CSI-RS resources, PRS resources, and/or the like) that can be associated with an SRS resource set for the UE 120 (e.g., for any type of SRS resource set).

As described above, a UE capability indicated for the non-power saving mode may be different from a UE capability indicated for the power saving mode. For example, the first list may indicate a first maximum number of downlink reference signal resources associated with any type of SRS resource and/or a first total number of ports across all downlink reference signal resources associated with any type of SRS resource, while the second list may indicate a second maximum number of downlink reference signal resources associated with any type of SRS resource and/or a second total number of ports across all downlink reference signal resources associated with any type of SRS resource. In some aspects, a UE capability indicated for the non-power saving mode may be more advanced than a UE capability indicated for the power saving mode. For example, the second maximum number of downlink reference signal resources associated with any type of SRS resource may be less than the first maximum number of downlink reference signal resources associated with any type of SRS resource, the second total number of ports across all downlink reference signal resources associated with any type of SRS resource may be less than the first total number of ports across all downlink reference signal resources associated with any type of SRS resource, and/or the like.

In some aspects, the UE 120 may indicate the first list of supported combinations and/or the second list of supported combinations in a UE capability report, a semi-static configuration message (e.g., an RRC message), in a MAC-CE, in a dynamic message (e.g., in uplink control information (UCI)), and/or the like.

As shown by reference number 615, the UE 120 may determine a transmission property for an SRS resource set (e.g., for one or more SRSs in the SRS resource set) using a first set of ports or a second set of ports. As described above in connection with FIG. 5, the second set of ports may be a subset of the first set of ports. In this case, the UE 120 may use the first set of ports when the UE 120 is not in a power saving mode. Conversely, the UE 120 may use the second set of ports when the UE 120 is in the power saving mode. In some aspects, the UE 120 may determine the first set of ports, and/or the base station 110 may configure the first set of ports for the UE 120, based at least in part on the first list of supported combinations. Similarly, the UE 120 may determine the second set of ports, and/or the base station 110 may configure the second set of ports for the UE 120, based at least in part on the second list of supported combinations.

For example, as shown by reference number 620, the base station 110 may transmit a downlink reference signal in the downlink reference signal resource indicated in a configuration, as described above in connection with FIG. 5. The UE 120 may measure the downlink reference signal resource, associated with the SRS resource set, using the first set of ports (e.g., more ports) when the UE 120 is operating in a non-power saving mode, or using the second set of ports (e.g., fewer ports) when the UE 120 is operating in a power saving mode. Based at least in part on the measurement, the UE 120 may determine a transmission property for transmission of one or more SRSs in the SRS resource set. For example, the UE 120 may determine an uplink precoder, and/or one or more other transmission properties described elsewhere herein, for transmission of the one or more SRSs based at least in part on measuring the downlink reference signal resource using the first set of ports or the second set of ports.

As shown by reference number 625, the UE 120 may transmit the one or more SRSs, configured in the SRS resource set, using the transmission property. For example, if the transmission property is an uplink precoder, then the UE 120 may transmit the one or more SRSs using the uplink precoder (e.g., by precoding the SRS transmissions according to the uplink precoder). By using fewer ports to measure a downlink reference signal resource when the UE 120 is in a power saving mode, the UE 120 may conserve battery power, such as by using fewer processing resources and/or memory resources for processing measurements (e.g., due to using a smaller number of ports), activating fewer antennas, and/or the like.

As indicated above, FIG. 6 is provided as an example. Other examples may differ from what is described with regard to FIG. 6.

Figure 7:
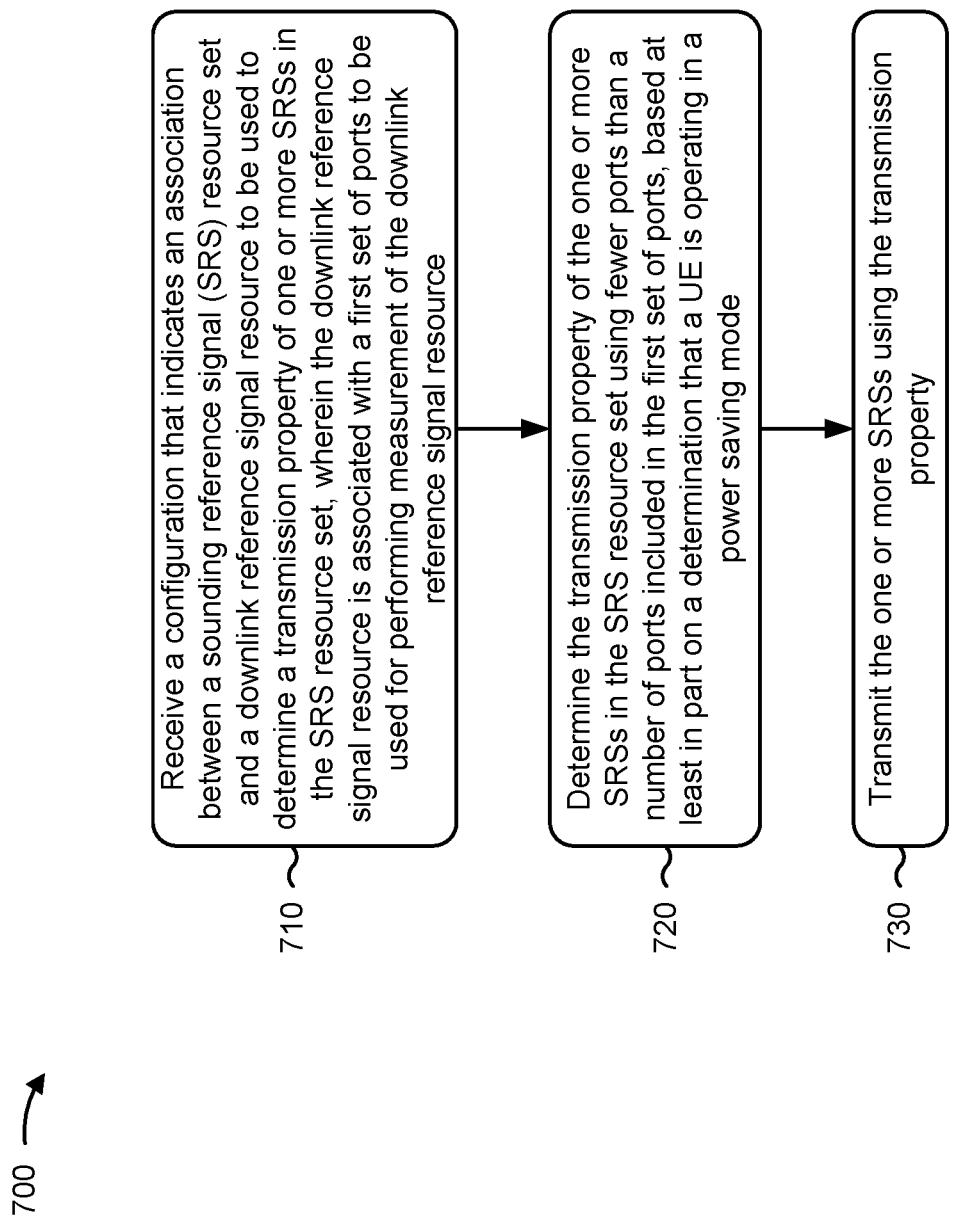
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with SRS and downlink reference signal association in a power saving mode.

As shown in FIG. 7, in some aspects, process 700 may include receiving a configuration that indicates an association between an SRS resource set and a downlink reference signal resource to be used to determine a transmission property of one or more SRSs in the SRS resource set, wherein the downlink reference signal resource is associated with a first set of ports to be used for performing measurement of the downlink reference signal resource (block 710). For example, the UE (e.g., using receive processor 258, controller/processor 280, memory 282, and/or the like) may receive a configuration that indicates an association between an SRS resource set and a downlink reference signal resource to be used to determine a transmission property of one or more SRSs in the SRS resource set, as described above. In some aspects, the downlink reference signal resource is associated with a first set of ports to be used for performing measurement of the downlink reference signal resource.

As further shown in FIG. 7, in some aspects, process 700 may include determining the transmission property of the one or more SRSs in the SRS resource set using fewer ports than a number of ports included in the first set of ports, based at least in part on a determination that the UE is operating in a power saving mode (block 720). For example, the UE (e.g., using receive processor 258, transmit processor 264, controller/processor 280, memory 282, and/or the like) may determine the transmission property of the one or more SRSs in the SRS resource set using fewer ports than a number of ports included in the first set of ports, based at least in part on a determination that the UE is operating in a power saving mode, as described above.

As further shown in FIG. 7, in some aspects, process 700 may include transmitting the one or more SRSs using the transmission property (block 730). For example, the UE (e.g., using transmit processor 264, controller/processor 280, memory 282, and/or the like) may transmit the one or more SRSs using the transmission property, as described above.

Process 700 may include additional aspects, such as any single aspect or any combination of aspects described below and/or in connection with one or more other processes described elsewhere herein.

In a first aspect, a performance requirement that the UE is expected to satisfy when the transmission property is determined using the fewer ports is different from a performance requirement that the UE is expected to satisfy when the transmission property is determined using all ports in the first set of ports.

In a second aspect, alone or in combination with the first aspect, the transmission property is determined without performing measurement of the downlink reference signal resource using any ports included in the first set of ports.

In a third aspect, alone or in combination with one or more of the first and second aspects, the transmission property is determined based at least in part on performing measurement of the downlink reference signal resource using a second set of ports that is a subset of the first set of ports.

In a fourth aspect, alone or in combination with one or more of the first through third aspects, the first set of ports is based at least in part on a first list of supported combinations, for the association between the SRS resource set and the downlink reference signal resource, reported by the UE to a base station for a non-power saving mode, and the second set of ports is based at least in part on a second list of supported combinations, for the association between the SRS resource set and the downlink reference signal resource, reported by the UE to the base station for the power saving mode.

In a fifth aspect, alone or in combination with one or more of the first through fourth aspects, the first list indicates a first maximum number of transmit ports for a single resource, a first maximum number of resources, and a first total number of ports, and the second list indicates a second maximum number of transmit ports for a single resource, a second maximum number of resources, and a second total number of ports.

In a sixth aspect, alone or in combination with one or more of the first through fifth aspects, at least one of: the second maximum number of transmit ports for a single resource is less than the first maximum number of transmit ports for a single resource, the second maximum number of resources is less than the first maximum number of resources, the second total number of ports is less than the first total number of ports, or a combination thereof.

In a seventh aspect, alone or in combination with one or more of the first through sixth aspects, the first list indicates a first maximum number of downlink reference signal resources associated with any type of SRS resource, and a first total number of ports across all downlink reference signal resources associated with any type of SRS resource, and the second list indicates a second maximum number of downlink reference signal resources associated with any type of SRS resource, and a second total number of ports across all downlink reference signal resources associated with any type of SRS resource.

In an eighth aspect, alone or in combination with one or more of the first through seventh aspects, at least one of: the second maximum number of downlink reference signal resources associated with any type of SRS resource is less than the first maximum number of downlink reference signal resources associated with any type of SRS resource, the second total number of ports across all downlink reference signal resources associated with any type of SRS resource is less than the first total number of ports across all downlink reference signal resources associated with any type of SRS resource, or a combination thereof.

In a ninth aspect, alone or in combination with one or more of the first through eighth aspects, at least one of the first list of supported combinations or the second list of supported combinations is reported in at least one of a UE capability report, a semi-static configuration message, a MAC-CE, a dynamic message, or a combination thereof.

In a tenth aspect, alone or in combination with one or more of the first through ninth aspects, the SRS resource set is for non-codebook based transmission and the downlink reference signal resource is a channel state information reference signal resource.

In an eleventh aspect, alone or in combination with one or more of the first through tenth aspects, the SRS resource set is for downlink channel acquisition or antenna switching, and the downlink reference signal resource is a channel state information reference signal resource.

In a twelfth aspect, alone or in combination with one or more of the first through eleventh aspects, the SRS resource set is for positioning and the downlink reference signal resource is a channel state information reference signal resource or a positioning reference signal.

In a thirteenth aspect, alone or in combination with one or more of the first through twelfth aspects, process 700 may include refraining from updating the transmission property if a time between a last symbol of the downlink reference signal resource and a first symbol of the one or more SRSs is less than: a first threshold, if the UE is being operating in a non-power saving mode, or a second threshold, if the UE is operating in the power saving mode, wherein the second threshold is greater than the first threshold.

In a fourteenth aspect, alone or in combination with one or more of the first through thirteenth aspects, the transmission property of the one or more SRSs is an uplink precoder to be used for transmission of the one or more SRS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration that indicates an association between a sounding reference signal (SRS) resource set and a downlink reference signal resource to be used to determine a transmission property of one or more SRSs in the SRS resource set, wherein the downlink reference signal resource is associated with a first set of ports which are less than a full set of ports, the first set of ports are used for performing measurement of the downlink reference signal resource;
   determining that the UE is operating in a power saving mode based at least in part on receiving the configuration;
   determining the transmission property of the one or more SRSs in the SRS resource set, without performing the measurement of the downlink reference signal resource using any ports included in the first set of ports, based at least in part on determining that the UE is operating in the power saving mode; and
   transmitting the one or more SRSs using the determined transmission property when the UE is operating in the power saving mode.

2. The method of claim 1, wherein a performance requirement that the UE is expected to satisfy when the transmission property is determined without performing the measurement of the downlink reference signal resource using any ports included in the first set of ports is different from a performance requirement that the UE is expected to satisfy when the transmission property is determined using all ports in the first set of ports.

3. The method of claim 1, further comprising:
   transmitting, to a network entity, a first list of supported combinations and a second list of supported combinations that are each for the association between the SRS resource set and the downlink reference signal resource,
      wherein the first list of supported combinations is for a non-power saving mode, and
      wherein the second list of supported combinations is for the power saving mode.

4. The method of claim 3, wherein the first list indicates a first maximum number of transmit ports for a single resource, a first maximum number of resources, and a first total number of ports, and
   wherein the second list indicates a second maximum number of transmit ports for a single resource, a second maximum number of resources, and a second total number of ports.

5. The method of claim 4, wherein at least one of:
   the second maximum number of transmit ports for a single resource is less than the first maximum number of transmit ports for a single resource,
   the second maximum number of resources is less than the first maximum number of resources,
   the second total number of ports is less than the first total number of ports, or
   a combination thereof.

6. The method of claim 3, wherein the first list indicates a first maximum number of downlink reference signal resources associated with any type of SRS resource, and a first total number of ports across all downlink reference signal resources associated with any type of SRS resource, and
   wherein the second list indicates a second maximum number of downlink reference signal resources associated with any type of SRS resource, and a second total number of ports across all downlink reference signal resources associated with any type of SRS resource.

7. The method of claim 6, wherein at least one of:
   the second maximum number of downlink reference signal resources associated with any type of SRS resource is less than the first maximum number of downlink reference signal resources associated with any type of SRS resource,
   the second total number of ports across all downlink reference signal resources associated with any type of SRS resource is less than the first total number of ports across all downlink reference signal resources associated with any type of SRS resource, or
   a combination thereof.

8. The method of claim 3, wherein at least one of the first list of supported combinations or the second list of supported combinations is reported in at least one of a UE capability report, a semi-static configuration message, a medium access control (MAC) control element, a dynamic message, or a combination thereof.

9. The method of claim 1, wherein:
   the SRS resource set is for non-codebook based transmission, and the downlink reference signal resource is a channel state information reference signal resource;
   the SRS resource set is for downlink channel acquisition or antenna switching, and the downlink reference signal resource is a channel state information reference signal resource; or the SRS resource set is for positioning, and the downlink reference signal resource is a channel state information reference signal resource or a positioning reference signal.

10. The method of claim 1, wherein the UE is associated with a first threshold for when the UE is operating in a non-power saving mode, and a second threshold, greater than the first threshold, for when the UE is operating in the power saving mode, and the method further comprising refraining from updating the transmission property if a time between a last symbol of the downlink reference signal resource and a first symbol of the one or more SRSs is less than:
the first threshold if the UE is operating in the non-power saving mode, or
the second threshold if the UE is operating in the power saving mode.

11. The method of claim 1, wherein the transmission property of the one or more SRSs is an uplink precoder to be used for transmission of the one or more SRSs.

12. A user equipment (UE) for wireless communication, comprising:
a memory; and
one or more processors coupled to the memory, the one or more processors configured to:
receive a configuration that indicates an association between a sounding reference signal (SRS) resource set and a downlink reference signal resource to be used to determine a transmission property of one or more SRSs in the SRS resource set, wherein the downlink reference signal resource is associated with a first set of ports which are less than a full set of ports, the first set of ports are used for performing measurement of the downlink reference signal resource;
determine that the UE is operating in a power saving mode based at least in part on receiving the configuration;
determine the transmission property of the one or more SRSs in the SRS resource set, without performing the measurement of the downlink reference signal resource using any ports included in the first set of ports, based at least in part on determining that the UE is operating in the power saving mode; and
transmit the one or more SRSs using the determined transmission property when the UE is operating in the power saving mode.

13. The UE of claim 12, wherein a performance requirement that the UE is expected to satisfy when the transmission property is determined without performing the measurement of the downlink reference signal resource using any ports included in the first set of ports is different from a performance requirement that the UE is expected to satisfy when the transmission property is determined using all ports in the first set of ports.

14. The UE of claim 12, wherein the one or more processors are further configured to:
transmit, to a network entity, a first list of supported combinations and a second list of supported combinations that are each for the association between the SRS resource set and the downlink reference signal resource,
wherein the first list of supported combination is for a non-power saving mode, and
wherein the second list of supported combinations is for the power saving mode.

15. The UE of claim 14, wherein the first list indicates a first maximum number of transmit ports for a single resource, a first maximum number of resources, and a first total number of ports, and
wherein the second list indicates a second maximum number of transmit ports for a single resource, a second maximum number of resources, and a second total number of ports.

16. The UE of claim 15, wherein at least one of:
the second maximum number of transmit ports for a single resource is less than the first maximum number of transmit ports for a single resource,
the second maximum number of resources is less than the first maximum number of resources,
the second total number of ports is less than the first total number of ports, or
a combination thereof.

17. The UE of claim 14, wherein the first list indicates a first maximum number of downlink reference signal resources associated with any type of SRS resource, and a first total number of ports across all downlink reference signal resources associated with any type of SRS resource, and
wherein the second list indicates a second maximum number of downlink reference signal resources associated with any type of SRS resource, and a second total number of ports across all downlink reference signal resources associated with any type of SRS resource.

18. The UE of claim 17, wherein at least one of:
the second maximum number of downlink reference signal resources associated with any type of SRS resource is less than the first maximum number of downlink reference signal resources associated with any type of SRS resource,
the second total number of ports across all downlink reference signal resources associated with any type of SRS resource is less than the first total number of ports across all downlink reference signal resources associated with any type of SRS resource, or
a combination thereof.

19. The UE of claim 14, wherein at least one of the first list of supported combinations or the second list of supported combinations is reported in at least one of a UE capability report, a semi-static configuration message, a medium access control (MAC) control element, a dynamic message, or a combination thereof.

20. The UE of claim 12, wherein:
the SRS resource set is for non-codebook based transmission, and the downlink reference signal resource is a channel state information reference signal resource;
the SRS resource set is for downlink channel acquisition or antenna switching, and the downlink reference signal resource is a channel state information reference signal resource; or
the SRS resource set is for positioning, and the downlink reference signal resource is a channel state information reference signal resource or a positioning reference signal.

21. The UE of claim 12, wherein the UE is associated with a first threshold for when the UE is operating in a non-power saving mode, and a second threshold, greater than the first threshold, for when the UE is operating in the power saving mode, and wherein the one or more processors are further configured to refrain from updating the transmission property if a time between a last symbol of the downlink reference signal resource and a first symbol of the one or more SRSs is less than:

the first threshold if the UE is operating in the non-power saving mode, or the second threshold if the UE is operating in the power saving mode.

22. The UE of claim 12, wherein the transmission property of the one or more SRSs is an uplink precoder to be used for transmission of the one or more SRSs.

23. A non-transitory computer-readable medium storing a set of instructions for wireless communication, the set of instructions comprising:

one or more instructions that, when executed by one or more processors of a user equipment (UE), cause the UE to:

receive a configuration that indicates an association between a sounding reference signal (SRS) resource set and a downlink reference signal resource to be used to determine a transmission property of one or more SRSs in the SRS resource set, wherein the downlink reference signal resource is associated with a first set of ports which are less than a full set of ports, the first set of ports are used for performing measurement of the downlink reference signal resource;

determine that the UE is operating in a power saving mode based at least in part on receiving the configuration;

determine the transmission property of the one or more SRSs in the SRS resource set, without performing the measurement of the downlink reference signal resource using any ports included in the first set of ports, based at least in part on determining that the UE is operating in the power saving mode; and transmit the one or more SRSs using the determined transmission property when the UE is operating in the power saving mode.

24. An apparatus for wireless communication, comprising:

means for receiving a configuration that indicates an association between a sounding reference signal (SRS) resource set and a downlink reference signal resource to be used to determine a transmission property of one or more SRSs in the SRS resource set, wherein the downlink reference signal resource is associated with a first set of ports which are less than a full set of ports, the first set of ports are used for performing measurement of the downlink reference signal resource;

means determining that the UE is operating in a power saving mode based at least in part on receiving the configuration;

means for determining the transmission property of the one or more SRSs in the SRS resource set, without performing the measurement of the downlink reference signal resource using any ports included in the first set of ports based at least in part on determining that the apparatus is operating in the power saving mode; and means for transmitting the one or more SRSs using the determined transmission property when the UE is operating in the power saving mode.

25. The non-transitory computer-readable medium of claim 23, wherein a performance requirement that the UE is expected to satisfy when the transmission property is determined without performing the measurement of the downlink reference signal resource using any ports included in the first set of ports is different from a performance requirement that the UE is expected to satisfy when the transmission property is determined using all ports in the first set of ports.

26. The non-transitory computer-readable medium of claim 23, wherein the one or more instructions, when executed by the one or more processors of the UE, further cause the UE to:

transmit, to a network entity, a first list of supported combinations and a second list of supported combinations that are each for the association between the SRS resource set and the downlink reference signal resource, wherein the first list of supported combinations is for a non-power saving mode, and wherein the second list of supported combinations is for the power saving mode.

27. The apparatus of claim 24, wherein a performance requirement that the apparatus is expected to satisfy when the transmission property is determined without performing measurement of the downlink reference signal resource using any ports included in the first set of ports is different from a performance requirement that the apparatus is expected to satisfy when the transmission property is determined using all ports in the first set of ports.

28. The apparatus of claim 24, further comprising:

means for transmitting, to a network entity, a first list of supported combinations and a second list of supported combinations that are each for the association between the SRS resource set and the downlink reference signal resource, wherein the first list of supported combinations is for a non-power saving mode, and wherein the second list of supported combinations is for the power saving mode.

29. The method of claim 1, wherein the one or more SRSs are transmitted without performing the measurement of the downlink reference signal using any ports included in the first set of ports.

30. The UE of claim 12, wherein the one or more SRSs are transmitted without performing the measurement of the downlink reference signal using any ports included in the first set of ports.

* * * * *